(12) United States Patent
Viti

(10) Patent No.: US 11,010,875 B2
(45) Date of Patent: *May 18, 2021

(54) APPARATUS AND METHOD TO COMPUTE A HIGH DYNAMIC RANGE IMAGE FROM A SINGLE ACQUISITION

(71) Applicant: Datalogic IP Tech S.r.l., Calderara di Reno (IT)

(72) Inventor: Marco Viti, Casalecchio di Reno (IT)

(73) Assignee: Datalogic IP Tech S.R.L., Bologna (IT)

( * ) Notice: Subject to any disclaimer, the term of this patent is extended or adjusted under 35 U.S.C. 154(b) by 58 days.

This patent is subject to a terminal disclaimer.

(21) Appl. No.: 16/425,888

(22) Filed: May 29, 2019

(65) Prior Publication Data
US 2020/0380646 A1    Dec. 3, 2020

Related U.S. Application Data

(63) Continuation-in-part of application No. 16/412,130, filed on May 29, 2019.

(51) Int. Cl.
*G06T 5/00* (2006.01)
*G06T 5/20* (2006.01)

(52) U.S. Cl.
CPC .............. *G06T 5/007* (2013.01); *G06T 5/002* (2013.01); *G06T 5/20* (2013.01); *G06T 2207/20208* (2013.01)

(58) Field of Classification Search
CPC ........ H04N 5/2355; G06T 2207/20208; G06T 5/007
See application file for complete search history.

(56) References Cited

U.S. PATENT DOCUMENTS

| | | | |
|---|---|---|---|
| 7,146,059 B1 | 12/2006 | Durand et al. | |
| 9,055,178 B2* | 6/2015 | Hirakawa | H04N 9/045 |
| 10,607,047 B2 | 3/2020 | Gao et al. | |
| 2010/0157078 A1 | 6/2010 | Atanassov et al. | |
| 2010/0195901 A1* | 8/2010 | Andrus | H04N 21/4318 382/162 |
| 2012/0293685 A1* | 11/2012 | Garten | G09G 5/14 348/229.1 |

(Continued)

FOREIGN PATENT DOCUMENTS

| | | |
|---|---|---|
| EP | 2927865 A1 | 10/2015 |
| EP | 2958101 A1 | 12/2015 |

OTHER PUBLICATIONS

Park et al., "23-1: HDR Imaging by Generating Multi-Exposures from a Single Image for HDR/LDR Displays," (https://doi.org/10.1002/sdtp.11632), SID 2017 Digest, 4 pages.

(Continued)

*Primary Examiner* — Ross Varndell
(74) *Attorney, Agent, or Firm* — Foley & Lardner LLP

(57) ABSTRACT

A system and method of processing an image may include capturing an image of a scene. Image data having M-bits per pixel of the image may be generated. Multiple sets of simulated image data of the scene may be generated by applying different simulated exposure times to the generated image data. A processed image may be derived from the sets of simulated image data. The image data having M-bits per pixel may be an HDR image, and the processed image may be an LDR image.

20 Claims, 18 Drawing Sheets

(56) References Cited

U.S. PATENT DOCUMENTS

| | | | |
|---|---|---|---|
| 2014/0140615 A1 | 5/2014 | Finlayson et al. | |
| 2014/0347521 A1* | 11/2014 | Hasinoff | H04N 5/265 348/239 |
| 2018/0053289 A1 | 2/2018 | Garcia Becerro et al. | |
| 2018/0335901 A1* | 11/2018 | Manzari | G06F 3/0485 |
| 2019/0228510 A1 | 7/2019 | Hwang et al. | |
| 2020/0177789 A1 | 6/2020 | Sheinin et al. | |

OTHER PUBLICATIONS

European Patent Application No. 20174304.4, European Search Report, dated Sep. 22, 2020, 10 pgs.

Kinosnita Yuma et al: Pseudo Multi-Exposure Fusion Using a Single Image, 2017 Asia-Pacific Signal and Information Processing Association Annual Summit and Conference (APSIPA ASC), IEEE, Dec. 12, 2017, pp. 263-269, XP033315442, DOI: 10.1109/APSIPA.2017.8282056 [retrieved on Feb. 5, 2018].

Raveendranath Athira et al: Single Shot High Dynamic Range Imaging Using Power Law Transformation and Exposure Fusion, 2016 International Conference on Communication Systems and Networks (COMNET), IEEE, Jul. 21, 2016, pp. 120-126, XP033045764, DOI: 10.1109/CSN.2016.7823999 [retrieved on Jan. 18, 2017].

Saha Rappy et al: Low Dynamic Range Image Set Generation from Single Image, 2019 International Conference on Electronics, Information, and Communication (ICEIC), Institute of Electronics and Information Engineers (IEIE), Jan. 22, 2019, pp. 1-3, XP033544760, DOI: 10.23919/ELINFOCOM.2019.8706401 [retrieved on May 3, 2019].

* cited by examiner

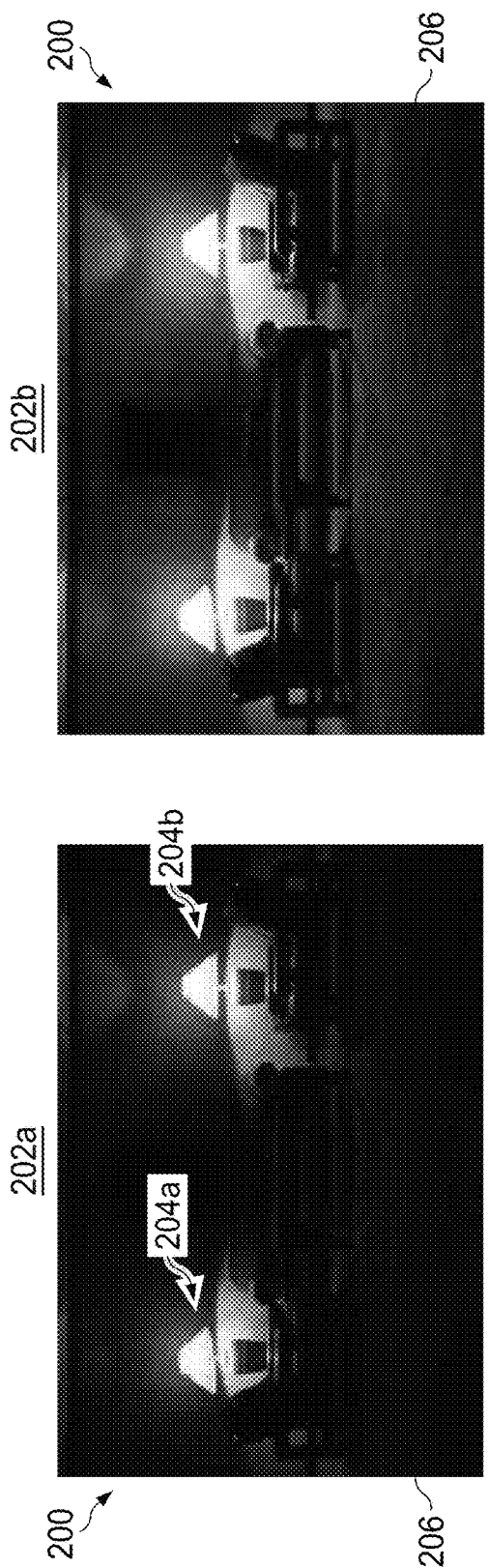
FIG. 2A
FIG. 2B
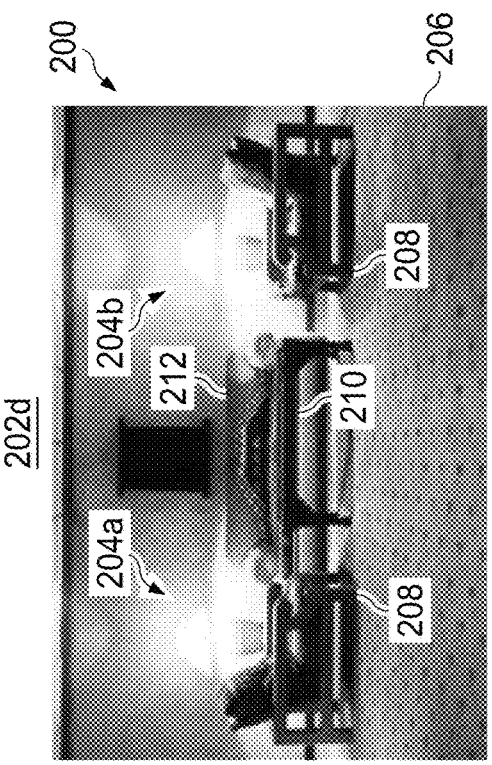
FIG. 2C
FIG. 2D

1100a

1102b

1102c

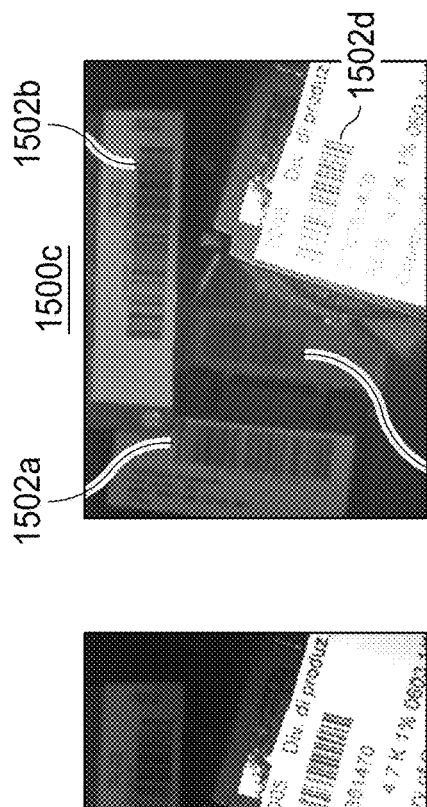
FIG. 15A
FIG. 15B
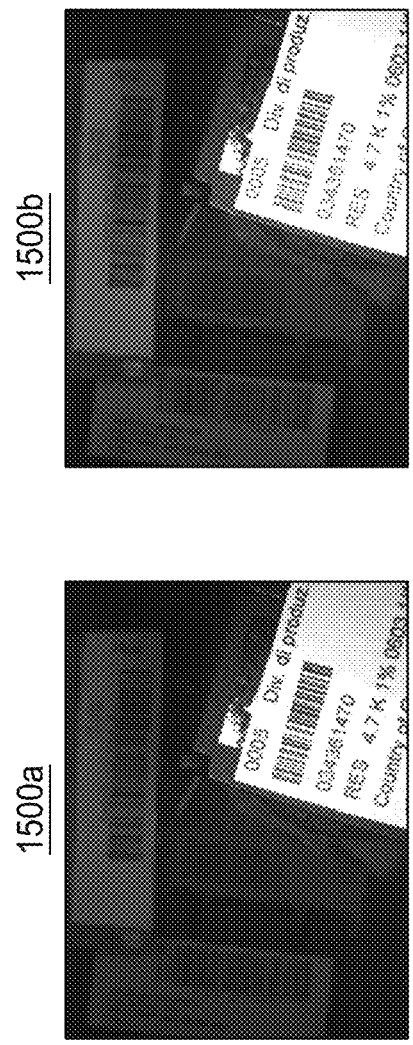
FIG. 15C
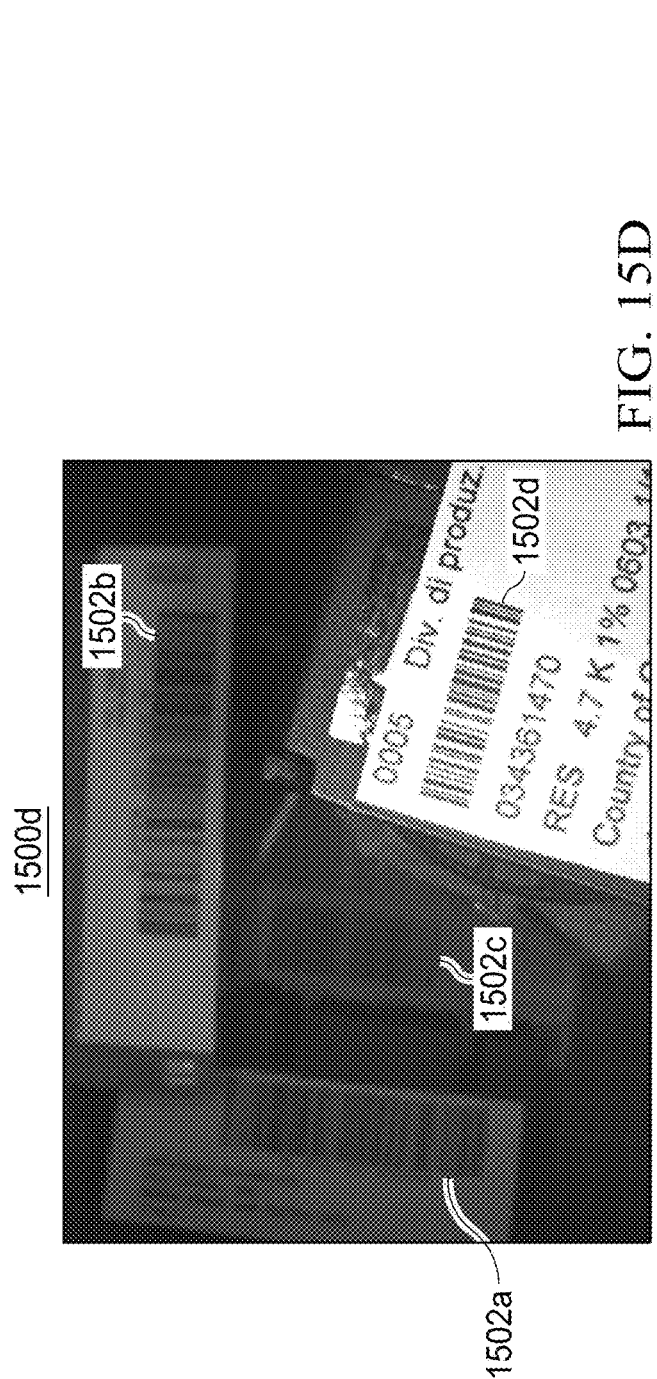
FIG. 15D

1800a

1800b

1800c

APPARATUS AND METHOD TO COMPUTE A HIGH DYNAMIC RANGE IMAGE FROM A SINGLE ACQUISITION

BACKGROUND

This is a Continuation-in-Part (CIP) of co-pending U.S. patent application having Ser. No. 16/412,130 filed May 14, 2019; the contents of which are herein incorporated by reference in their entirety.

BACKGROUND

Photographic images often have very large ratios between the brightest and darkest regions of the images. Such images with very large bright-to-dark lighting ratios with more than 8 bits are known as high dynamic range (HDR) images. Digital images are quite often captured with 10, 12, or more bits per pixel. With regard to FIGS. 1A and 1B, an image of a scene 100 with a high dynamic range, but displayed with a low dynamic range (LDR), such that lighting of the image appears very flat is shown. As can be seen in the region 102, a bright background around the individual's face 104 creates a high contrast between brightness and darkness. Also shown is a shadow 106 formed by the individual. The individual's face 104 in FIG. 1A is shown to be dark in appearance because of the flatness in the lighting in the LDR image, as compared to the individual's face 104 in FIG. 1B that is brighter in appearance because a conventional tone mapping algorithm has been applied to improve the dynamic range of the image.

More specifically, when an HDR image, such as shown in FIG. 1A, is displayed on a standard monitor that has 8 bits per pixel, the HDR image looks very flat because the 8 bits per pixel results in a low dynamic range image (i.e., an image in which the contrast between bright and dark regions is relatively limited and medium brightness levels tend to be close together). That is, the reason why HDR images appear to have low dynamic range is because the wide range of brightness has to be compressed to fit within a much smaller range of brightness. For example, an HDR image having 10 bits per pixel image (or otherwise described as 10-bit pixel image) has 1024 (2^10) brightness levels for each pixel as compared to a LDR image having 8 bits per pixel image only has 256 (2^8) brightness levels. As a result, there is an overall lack of contrast, which results in flatness and potentially other visual artifacts in the LDR images. As shown in FIG. 1A, the individual's face 104 is difficult to see and features in the grass within the shadow 106 because the contrast is narrow.

An HDR image can be captured by an HDR camera or the HDR image may be created (not captured) from many LDR images captured by a standard camera by capturing three or more photos with different exposure levels. For example, if three LDR images are captured, one of the images may be properly exposed, while the other two photos are often overexposed and underexposed. These three images typically capture suitable details in the highlights and the shadows of the scene. However, the problem is that the images then have to be combined to correct the bright and dark regions so that details in those regions are properly visible.

With further regard to FIG. 1B, tone mapping is a technique that adjusts contrast locally so that each region of the image uses the whole brightness range for maximum contrast. Tone mapping is also often used in image processing and in computer graphics to map one set of colors to another set of colors in order to approximate the appearance of high dynamic range images in a medium or in another image that has a more limited dynamic range. Tone mapping is often an improvement over other image processing techniques that map the whole image into the LDR brightness range because the bright and dark regions are often not properly corrected. FIG. 1B is an image of the scene 100 of FIG. 1A that was processed using conventional tone mapping. Tone mapping, however, is a process that is generally complex and time-consuming. In this case, the tone mapping causes the lighting and detail to be much better as exemplified by the added detail in the face 104 and shadow 106 in the grass of FIG. 1B as compared to the face 104 and shadow 106 of FIG. 1A.

As a result of modern day cameras having the ability to capture multiple images in quick succession and with different exposure levels, algorithms have been created for combining multiple images into a single image in which each of the input image information is involved without producing any image artifacts, such as halos. The algorithms determine a proper exposure for each region of the image such that a maximum level of information may be presented in the image. However, such image processing techniques are not good for capturing images of a scene in which motion occurs (e.g., object moving, converge moving, or both moving) because successive images a moving object will show to be in different positions within each of the different images.

With regard to FIGS. 2A-2D, four different images of the same scene 200 are shown to have been captured at different exposure levels in the images 202a-202d (collectively 202). In FIG. 2A, the exposure level is low or short, so that the image is dark, but because of the brightness of lamps 204a and 204b (collectively 204), good resolution of the lamps 204. However, the remainder of the image 202a away from the lamps 204 is dark, so less detail for the remainder of the image 202a exists. As the exposure level is increased in FIGS. 2B-2D, more detail is shown at the lamps 204, but the remainder of the scene 200 is still limited in detail due to the darkness. As shown in FIG. 2C, the lamps 204 are beginning to become oversaturated because the exposure has further been increased, but resolution of a carpet 206 is beginning to show because of increased exposure level. And, as shown in FIG. 2D, as the exposure level is further increased, even more resolution of the carpet 206, chairs 208, and other areas of the scene 200, but also because of the increased exposure, the image region at the lamps 204 are oversaturated and resolution is decreased or completely lost. These four images 202 may be combined using a conventional tone mapping algorithm that combines the multiple images 202a-202d to generate an output image 202e of FIG. 2E with the best resolution of each of the various areas of the scene 200. As shown in the image 202e, the lamps 204 are not oversaturated with light and the carpet 206 is not under-saturated with light, thereby generating an image 202e with the maximum amount of information of the scene 200. In summary, the first step includes computing an HDR image from the multiple LDR images, and the second step includes performing tone mapping from the multiple images in order to obtain an LDR detailed output image to obtain an LDR image with locally adjusted lighting contrast in order to have a maximum level of detail of each object in the scene 200 in the LDR image. In this case, the lamps 204 are derived from the first image 202a, which was captured with the smallest exposure time, while the carpet 206 and chairs 208, among other features, are derived from the last image 202d, which was captured with the largest exposure time, and the table 210, the couch 212, and chairs 208 are derived from the middle images 202b and 202c, which were captured with medium exposure times between the first and last images 202a and 202d.

As previously indicated, the ability to perform tone mapping requires multiple images to be captured, and if a non-static scene exists in which there is motion in the scene or there is motion with the camera relative to the scene, then it is not possible to use the tone mapping algorithm because each image would contain motion of one or more objects in the scene. Moreover, modern image sensors generate image data with more than eight bits per pixel (HDR images) while software applications process 8-bit images (LDR images). As a result, to accommodate the different bits per pixel, less significant bits of the HDR input images are discarded, which means that information is being lost, such that flat images and images that have halo effects where lighting quickly transitions from dark to bright or vice versa results. As such, there is a need for new systems and processes that do not have the limitations of existing image processing (e.g., tone mapping) of HDR images to LDR images.

BRIEF SUMMARY

To overcome the problem of flatness of LDR images derived from HDR images and having to capture multiple HDR images to produce an LDR image, a single shot HDR image processing system may be utilized. Because the mathematics of the system are relatively simplistic, the system may be performed using hardware or an embedded firmware system that operates at real-time or near-real-time speeds. By being able to perform the image processing from a single image, the problem of motion in the scene is eliminated as compared to conventional tone mapping solutions.

One embodiment of a method of processing an image may include capturing an image of a scene. Image data having M-bits per pixel of the image may be generated. Multiple sets of simulated image data of the scene may be generated by applying different simulated exposure times to the generated image data. A processed image derived from the sets of simulated image data may be generated. The image data having M-bits per pixel may be an HDR image, and the processed image may be an LDR image.

One embodiment of a system for processing an image may include an image sensor configured to capture an image of a scene and to generate image data having M-bits per pixel of the image. Electronics may be in electrical communication with said image sensor, and be configured to (i) generate a plurality of sets of simulated image data of the scene by applying different simulated exposure times to the generated image data, and (ii) generate a processed image derived from the sets of simulated image data. The image data having M-bits per pixel may be an HDR image, and the processed image may be an LDR image.

BRIEF DESCRIPTION OF THE DRAWINGS

Illustrative embodiments of the present invention are described in detail below with reference to the attached drawing figures, which are incorporated by reference herein and wherein:

FIGS. 2A-2D are multiple images of a scene captured by a camera with four different exposure levels;

FIGS. 15A-15C are sets of image data generated by simulating exposure levels of a single HDR image with the focus on the nearest code;

FIG. 15D is an LDR detailed output image generated by the algorithm of FIG. 4 that shows how the four barcodes are visible simultaneously, where the nearest barcode is from FIG. 15A and the other three are from FIGS. 15B-15C;

DETAILED DESCRIPTION OF THE DRAWINGS

Figure 1B:
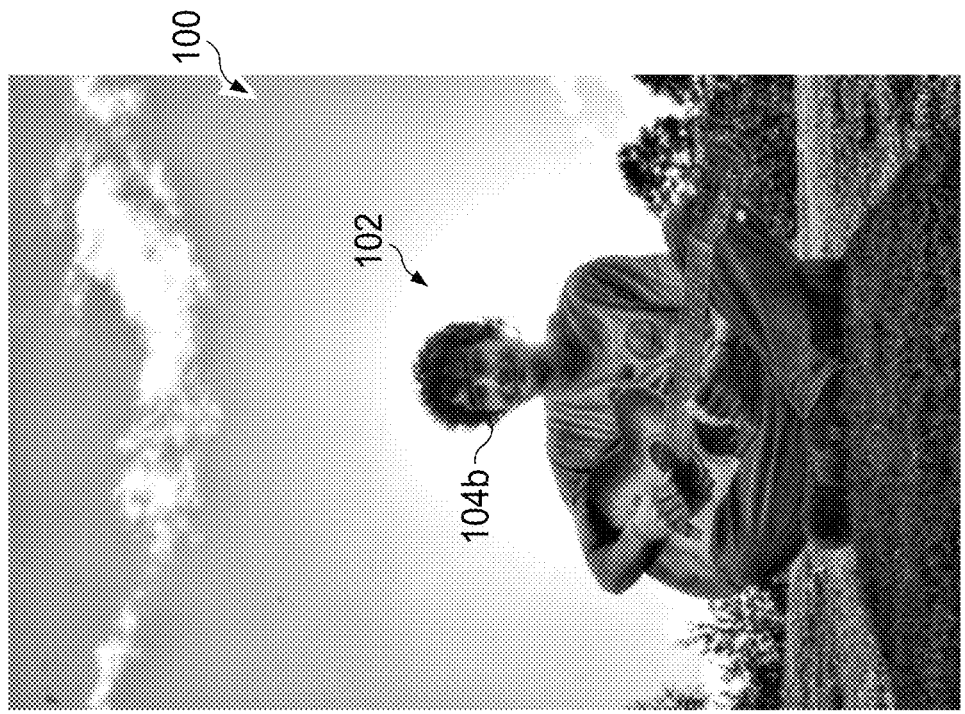
FIG. 1B is an image of the scene of FIG. 1A, but after a tone mapping algorithm has been applied to improve the dynamic range of the image.
Figure 1A:
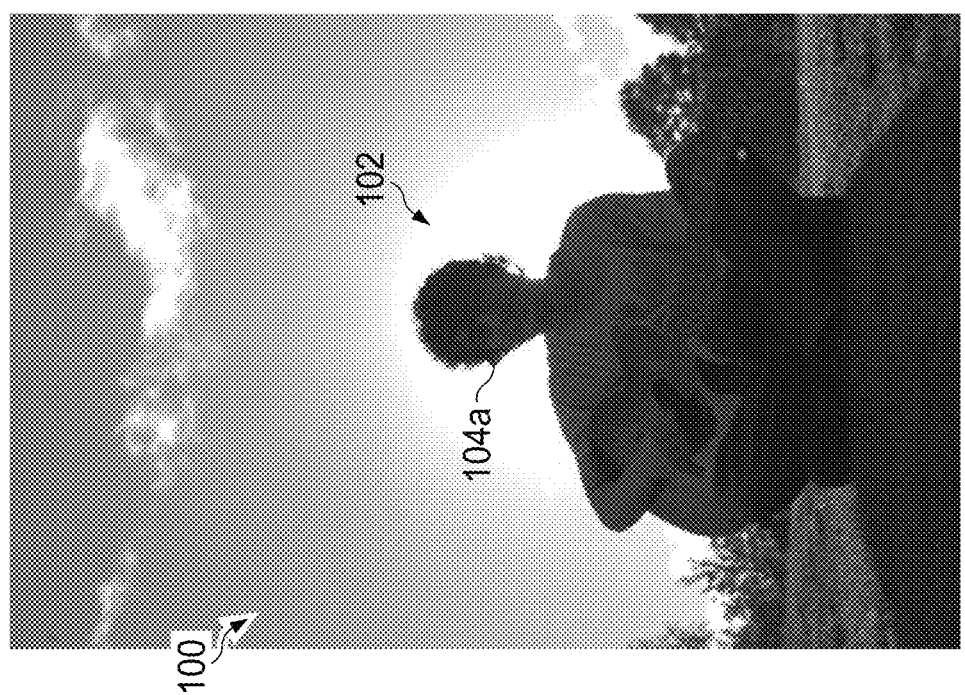
FIG. 1A is an image of a scene with a high dynamic range, but displayed with a low dynamic range, thereby causing lighting of the image to look very flat.
Figure 2E:
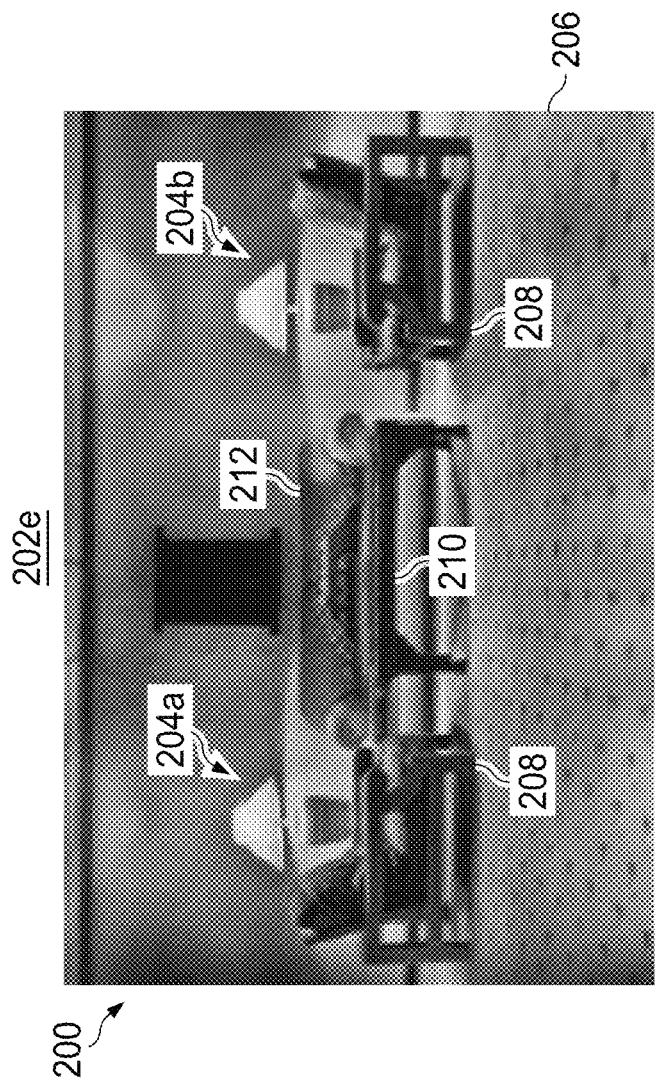
FIG. 2E is a combination of the images of FIGS. 2A-2D by using a conventional tone mapping algorithm such that maximum level of detail of each object results in the combined image.
Figure 3:
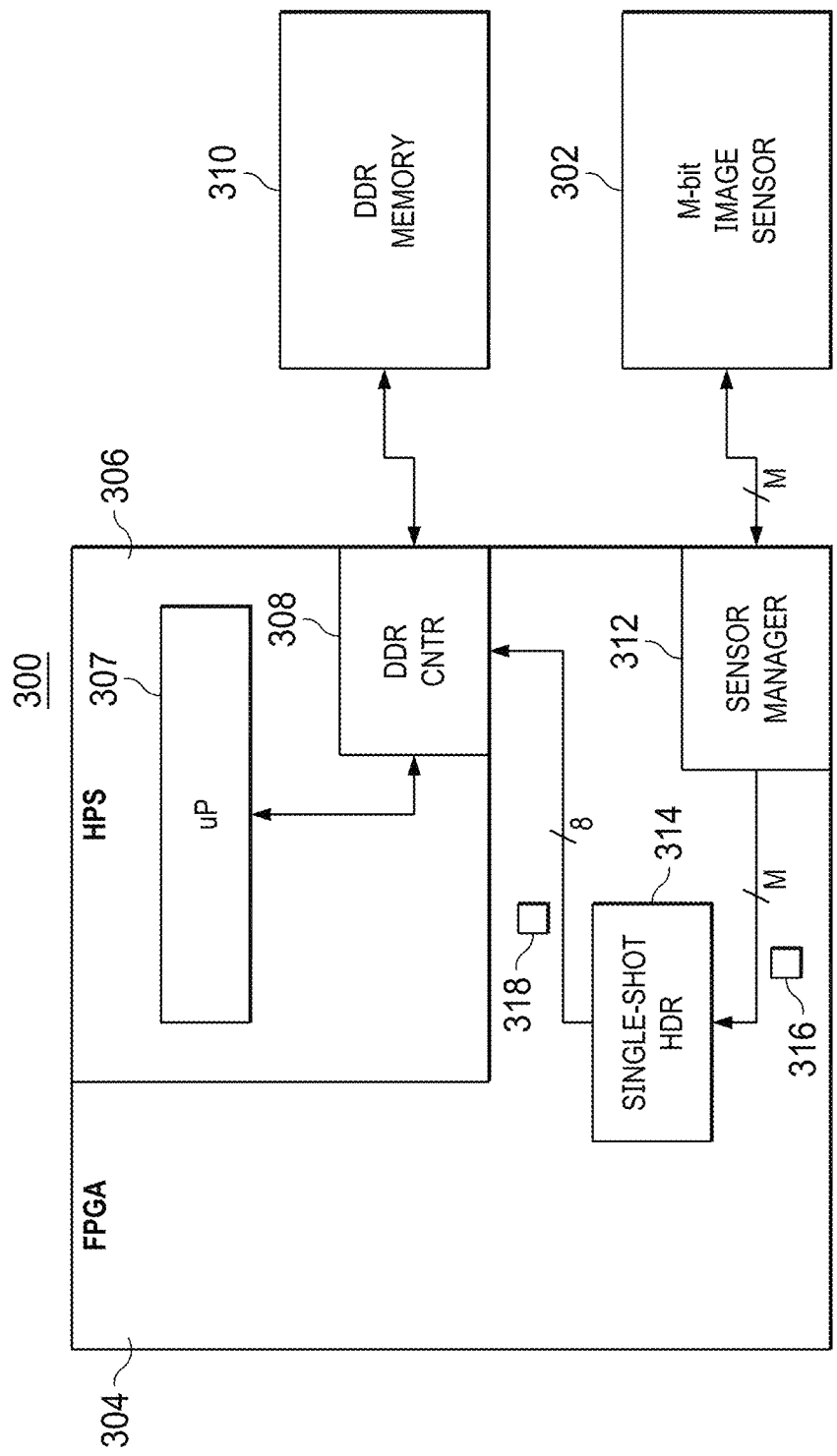
FIG. 3 is a block diagram of a system that may be utilized to implement a hardware system to execute a high dynamic range algorithm.
Figure 4:
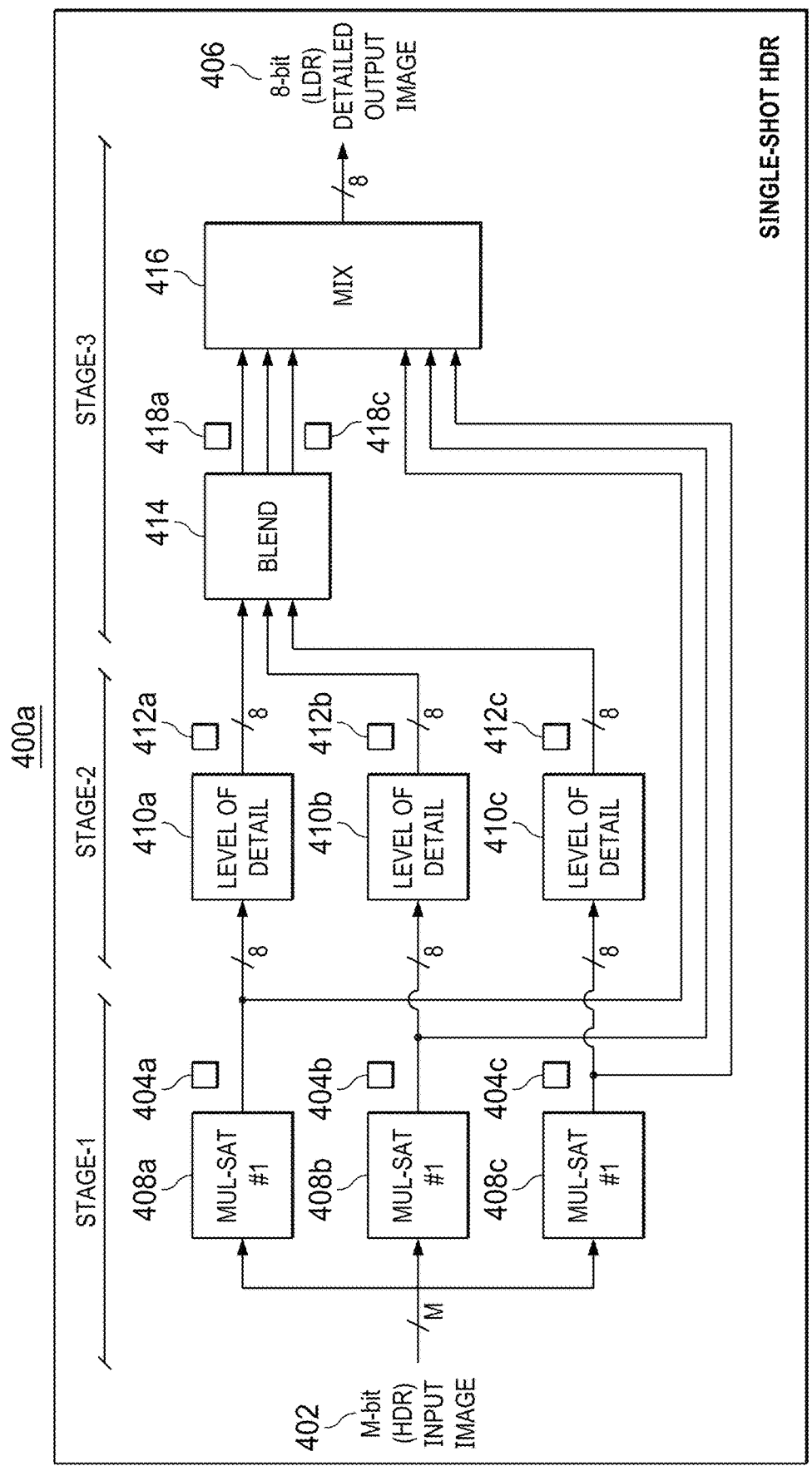
FIG. 4 is a block diagram of a single-shot HDR algorithm that performs image processing on a single HDR input image and create simulated images with different exposure levels that are used to produce an LDR detailed output image.

With regard to FIG. 3, a block diagram of a hardware system 300 that may be utilized to implement a system to execute a single-shot high dynamic range (HDR) algorithm as provided in FIG. 4 is shown. The system 300 is shown to include an M-bit image sensor 302 that captures images of a scene and generates M-bits per pixel data. A field programmable gate array 304 may be configured with a hard processing system (HPS) 306 that includes a microprocessor 307 and double data rate (DDR) memory controller 308 for controlling a DDR memory 310. A sensor manager 312 and single-shot HDR unit 314 may be included to control operation of the image sensor 302, communicate M-bit HDR image data 316 to the single-shot HDR unit 314, which outputs 8-bit LDR image data 318. The 8-bit LDR image data is communicated to the DDR memory controller 308 for processing by the microprocessor 306. By including the DDR memory controller 308, the microprocessor 306 and FPGA 304 may access the same data. The image sensor 302 outputs M-bits per pixel, where M is greater or equal to 9, while the single-shot HDR unit 314, as detailed in FIG. 4, may be implemented in hardware to process the image pixels on-the-fly (i.e., real-time or near-real-time) without any computational load for the microprocessor 306 and adding only some negligible latency to the image acquisition.

A core principle of the single-shot HDR algorithm is to capture a single image with M-bits per pixel, where M>8, and generate an LDR detailed output image with 8-bits per pixel. Moreover, the single-shot HDR algorithm is able to function without performing multiple image acquisitions with different exposure times, as performed by conventional tone mapping algorithms, as previously described.

More specifically, the single-shot HDR algorithm may operate in the following manner:

1. acquire one image with M bits per pixels, where M is greater than 8;

2. multiply the pixels of the image for K different values (V1, V2, . . . VK), obtaining K different images with P-bits per pixel (where P is greater than M);

3. transform each of the K images from a P-bit image to an 8-bit image by including the 8 bits from bit number M-1 to bit number M-8, and saturating the value of the pixel at 255 (i.e., maximum 8-bit value) if at least one of the more significant bits (from bit number P-1 to bit number M) is not equal to 0.

4. computing an HDR output image as if each image would be acquired with a different exposure time. For example, if a time of exposure (texp)=100 μs, M=10, K=3 and V1=1, V2=2, V3=4, from the acquired 10-bit image, 3 different 8-bit simulated images may be generated, where the one obtained from V1=1 corresponds to an exposure time equal to about 100 μs, the one obtained from V2=2 corresponds to an exposure time equal to about 200 μs and the last one obtained from V3=4 corresponds to an exposure time equal to about 400 μs. It should be understood that this exposure time computation is only a rough estimation and does not affect later stages of the single-shot HDR algorithm. Furthermore, the algorithm may be independent (i.e., unknown) of exposure time values of the input images. It should be noted that the multiplier values V1, V2, and V3, may be fractional also.

It is further noted that the single-shot HDR algorithm does not lead to the same LDR-detailed output image that would be obtained performing K different image acquisitions with K different exposure times, and the reason is not only a due to capturing an image of a non-static scene. Even if a static-scene were captured, computing the K 8-bit images from the M-bit input image using the less significant bits introduces more noise than acquiring K images with different exposure times. As shown hereinbelow, the results are more than acceptable so the use of a single-shot HDR algorithm provides for computing the LDR detailed output images with a single image acquisition.

With regard to FIG. 4, a block diagram of a single-shot HDR algorithm 400, shown as a high-level view 400 that (i) performs image processing on a single HDR input image 402 of M-bits per pixel (e.g., 10 bits per pixel) and (ii) creates simulated images 404a-404c (collectively 404) with different simulated exposure levels that are used to produce an LDR detailed output image 406 are shown. As indicated, the simulated images 404 are 8-bits per pixel.

The single-shot HDR algorithm 400 includes three stages, including Stage-1, Stage-2, and Stage-3, within which different functions of the algorithm 400 are performed. It should be understood that the number of blocks and starting and ending locations of the blocks may vary and are not limiting.

Stage-1 may include a set of multiply-saturate blocks 408a-408c (collectively 408), in this case three multiplier-saturate blocks 408. The blocks 408 are configured to simulate different lighting exposure levels to produce the respective simulated images 404. It should be understood that the number of blocks 408 may be two or more blocks, as well, to increase the number of simulated images (i.e., the more blocks 408, the more simulated images). The simulated images 404 may be communicated to Stage-2 for processing.

Stage-2 includes level of detail blocks 410a-410c (collectively 410) that generate images 412a-412c (collectively 412) having different levels of detail. The different levels of detail in the images 412 are created using mathematical functions. It should be understood that the number of detail blocks 410 may be two or more blocks, as well, to increase the number of detailed images (i.e., the more blocks 410, the higher levels of detail that may be generated and/or analyzed). The images 412 may be communicated to Stage-3 for processing.

Stage-3 includes two main blocks, including a blend function 414 and mix function 416. The blend function 414 uses the level of detail of each pixel in each image and performs mathematical computations to create blended images 418a-418c (collectively 418). The blended images 418 and simulated images 404 may be mixed by the mixing function 416 to produce the LDR detailed output image 406.

Figure 5:
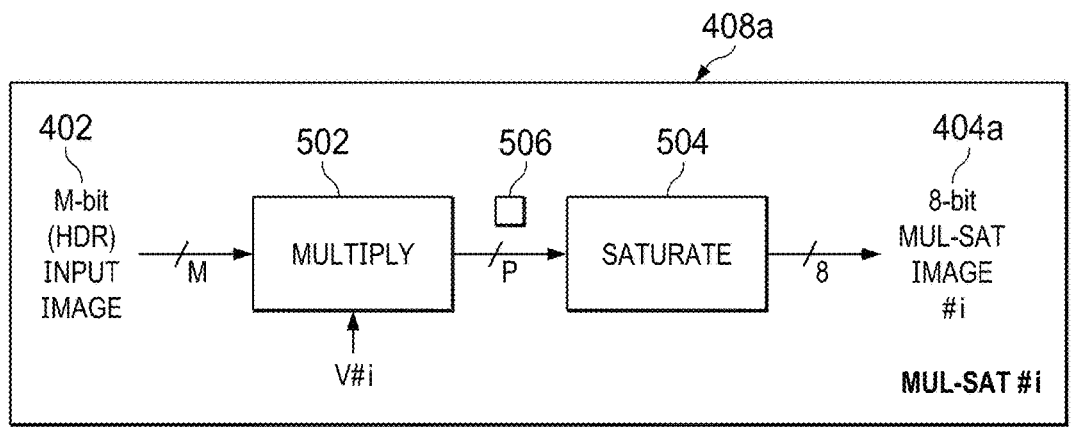
FIG. 5 is a block diagram of functions performed within multiply-saturate (MUL-SAT) blocks of Stage-1 of the single-shot HDR algorithm of FIG. 4.

With regard to FIG. 5, a block diagram of a multiply function 502 and saturate function 504 performed within the multiply-saturate blocks 408 of Stage-1 of the algorithm of FIG. 4 is shown. Input into the multiply function 502 is the M-bit HDR input image 402 having M-bits per pixel along with a multiplier value V #i, where each of the multiplier values V #i may be set by a user or automatically selected by the system based on lighting or other conditions of the camera and/or scene. To generate simulation images with different lighting values, each of the multiplier-saturate functions 408a-408c may be provided with different multiplier values V #i, as previously described. As shown, the M-bit HDR input image 402 may result in a P-bit image 506 after the multiply function 502, and the saturate function 504 may reduce the number of bits per pixel from P-bits to 8-bits per pixel by using the less significant bits, as previously described.

Figure 6:
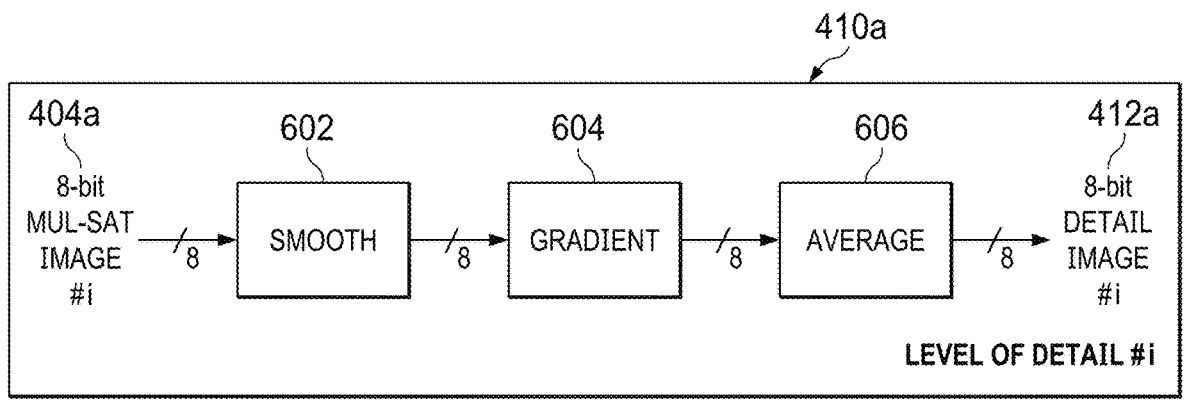
FIG. 6 is a block diagram of the functions performed within level of detail blocks of Stage-2 of the single-shot HDR algorithm of FIG. 4.

With regard to FIG. 6, a block diagram of the functions performed within the level of detail blocks 410 of Stage-2 of the algorithm of FIG. 4 is shown. The functions may include a smooth function 602, gradient function 604, and average function 606. The smooth function 602 may be implemented using a low-pass filter, Gaussian filter, and/or any other filter that smoothens data, as understood in the art. The gradient function 604 may utilize a gradient filter or any other mathematical function that computes lighting gradients within an image. The average function 606 may be implemented using a low-pass filter or any other filter that performs averaging within image data. For example, the average function 606 may be configured to compute an average gray level of each pixel, such as by averaging a pixel and neighboring pixels of the pixel of the gradient images. That is, the average function 606 may calculate a mean value of the gradient values resulting from the gradient function 604. Output from the level of detail block 606 is the detail image 412a. It should be understood that each of the level of detail blocks 410 may have the same or similar functions for generating the detailed images 412.

Figure 7:
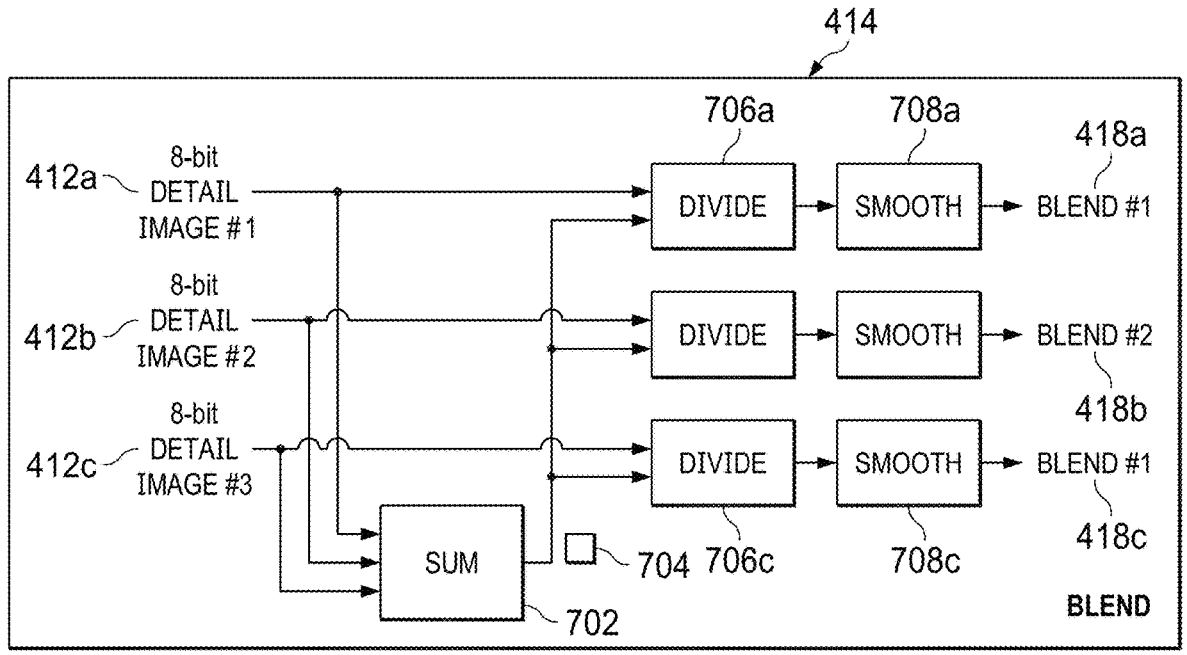
FIG. 7 is a block diagram of functions used to perform a blend function within Stage-3 of the algorithm of FIG. 4.

With regard to FIG. 7, a block diagram of functions used to perform the blend function 414 within Stage-3 of the algorithm 400 of FIG. 4 is shown. The blend function 414 may be configured to receive the detailed images 412 and output blended images 418. More particularly, the blend function 414 mixes the gray level values of each image, and executes a blending algorithm by computing a ratio between each detail in each of the images against the total detail of the images. The mixing function then smooths the images in order to obtain an LDR-detailed output image with smooth transitions between different exposures. In operation, the detailed images 412 are summed together using a sum function 702 to output a summed image 704. Divide functions 706a-706c (collectively 706) may divide the respective detailed images 412 by the summed image 704. Each of the outputs from the divide functions 706 may be smoothed by smooth functions 708a-708c (collectively 708) to generate the respective blended images 418a. The blend function 414 may be used to determine which is the best image from the three computed images, and scores each image.

Figure 8:
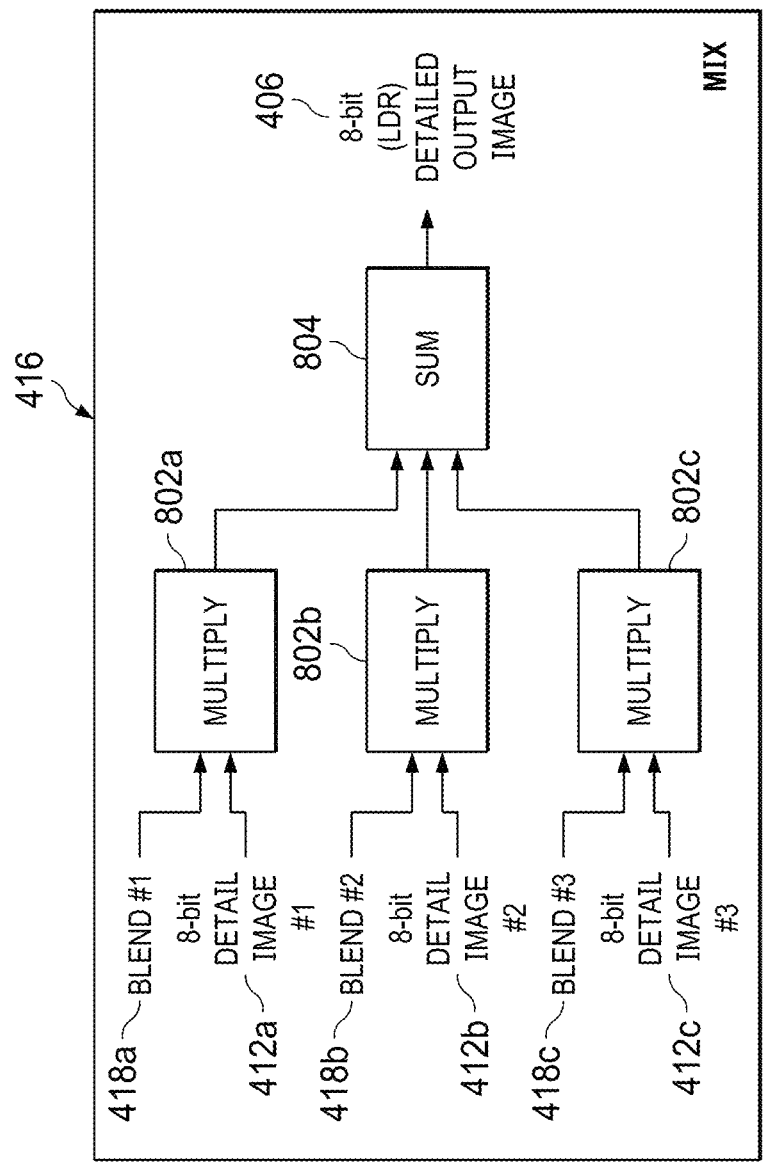
FIG. 8 is a block diagram of a mix function performed within Stage-3 of the single-shot HDR algorithm of FIG. 4.

With regard to FIG. 8, a block diagram of the mix function 416 performed within Stage-3 of the single-shot HDR algorithm of FIG. 4 is shown. The mix function 416 may be configured to receive and multiply the respective detailed images 412 produced by the level of detail blocks 410 and blended images 418 produced by the blend function 414 using multiply functions 820a-802c (collectively 802). The results from the multiply functions 802 may be summed by a summing function 804 to produce the 8-bit (LDR) detailed output image 406, or more precisely, a weighted average of the pixel values of the different exposure time images.

In FIG. 4, K=3, so there are only 3 image processing chains, and each function within the chain has 3 corresponding functions. In general, however, there may be 2 to 5 image processing chains (theoretically there may be even more than 5, but the state-of-the-art HDR algorithms usually do not exceed 5).

The multiplier values have to be chosen according to M. In particular, the minimum value is equal to 1 while the maximum value is equal to $2^{(M-8)}$. For example, if the image sensor produces images with 10 bits per pixel, then the multiplier values are typically selected between 1 and 4.

Figure 9A:
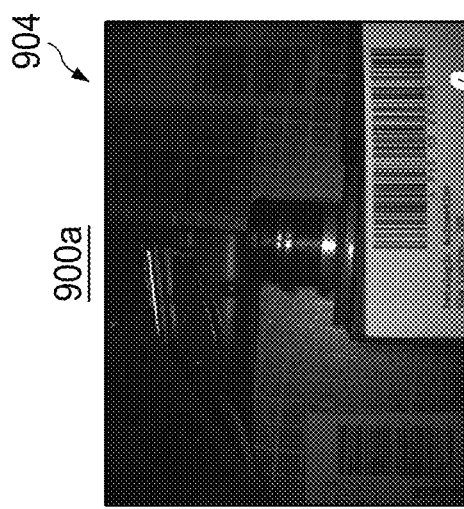
FIGS. 9A-9C are sets of image data produced with simulated lighting that are output from Stage-1 of the single-shot HDR algorithm of FIG. 4.
Figure 9B:
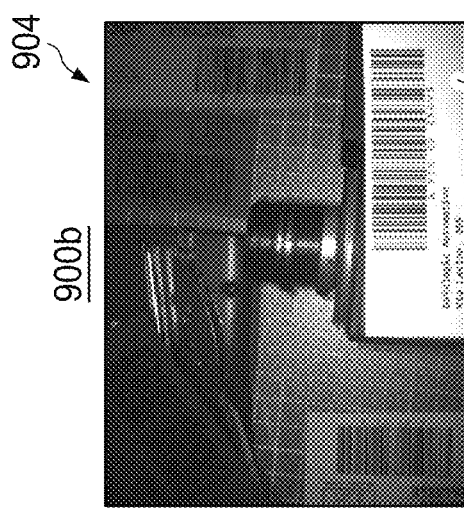
Figure 9C:
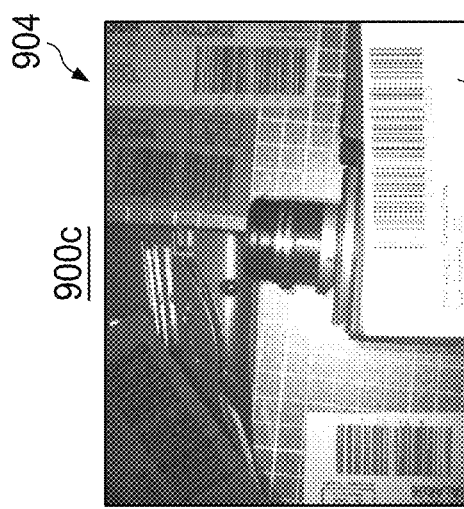

With regard to FIGS. 9A-9C, sets of image data 900a-900c (collectively 900) with simulated lighting that are output from Stage-1 of the algorithm 400 of FIG. 4 are shown. Most notably, barcode labels 902a, 902b, and 902c are shown with increasing brightness as the simulated lighting produced by the multiplier values V #i are successively increased for each of the different multiply functions (e.g., multiply function 502 of FIG. 5) used in the multiply saturate blocks 408 of FIG. 4. It can also be seen how other barcodes in the background 904 are difficult to see in the first set of input data 900a, but are easier to see in the second and third set of input data 900b and 900c.

Figure 10A:
FIGS. 10A-10C are image data derived from the images of FIGS. 9A-9C that have been smoothed by a smoothing function of FIG. 6 and within Stage-2 of the single-shot HDR algorithm of FIG. 4.
Figure 10B:
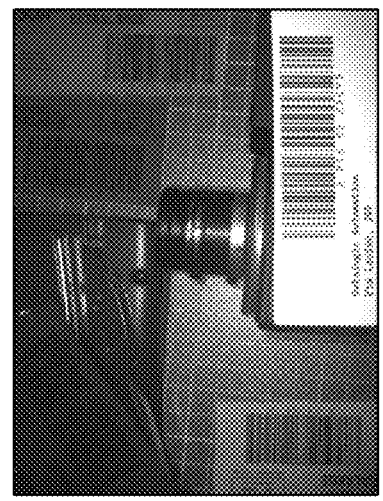
Figure 10C:
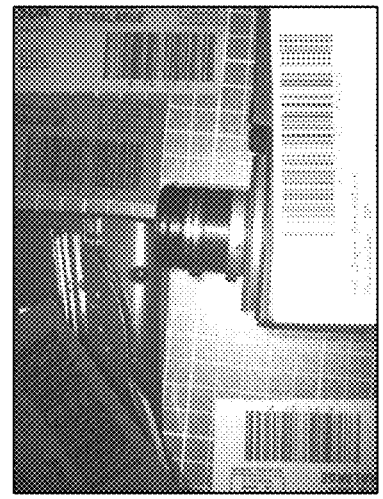

With regard to FIGS. 10A-10C, sets of smoothed image data 1000a-1000c (collectively 1000) derived from the image data 900 of FIGS. 9A-9C that have been smoothed by a smoothing function 602 of FIG. 6 and within Stage-2 of FIG. 4 are shown. Applying a smoothing function helps to eliminate sharp edges in the image data 900.

Figure 11A:
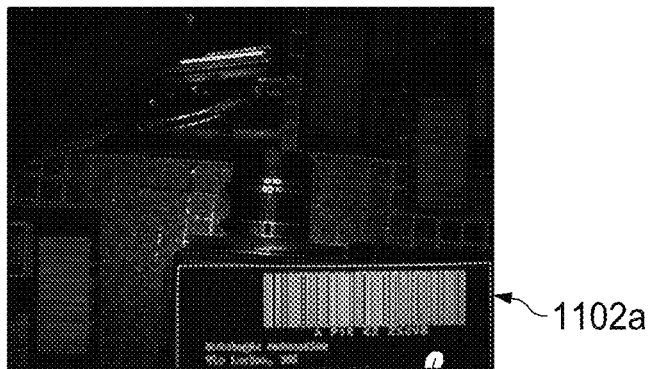
FIGS. 11A-11C are images generated by a gradient algorithm of the single-shot HDR algorithm within Stage-2 of FIG. 4.
Figure 11B:
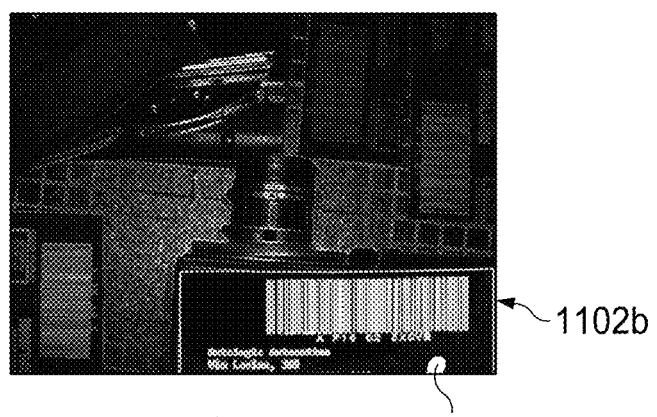
Figure 11C:
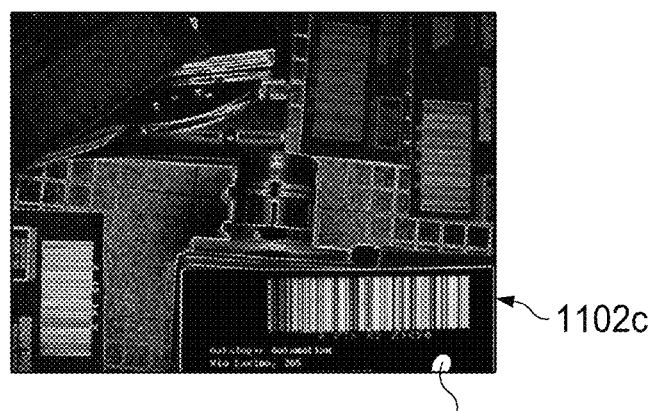

With regard to FIGS. 11A-11C, sets of gradient image data 1100a-1100c (collectively 1100) generated by a gradient algorithm 604 of FIG. 6 and within Stage-2 of FIG. 4 are shown. Notably, the gradient data 1100 highlights barcodes, such as barcodes 1102a-1102c (collectively 1102) in the barcode labels 902a-902c. It can be seen that as the brightness increases the image data 1100a-1100c, the barcodes 1102 alter in appearance, which may mean that if the first barcode 902a is not decodable because the image is too dark and the last barcode 902c is not decodable because the image is too bright, then the middle barcode 902b is decodable because the simulated lighting strikes a good balance between being too dark and too bright. The level of detail of the barcodes 1102 is shown to vary across different simulated lighting. The multiplier V #i of FIG. 5 may be selectable to optimize such simulated lighting functionality.

Figure 12A:
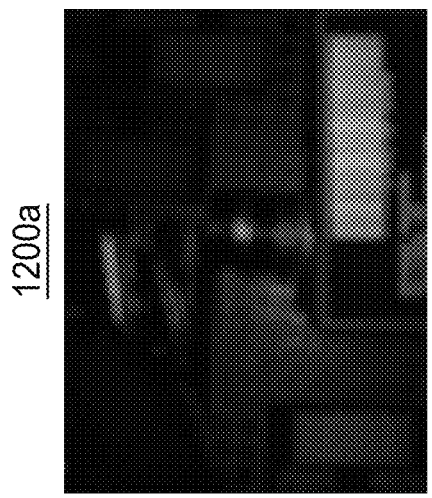
FIGS. 12A-12C are sets of image data generated by an average function within Stage-2 of the single-shot HDR algorithm of FIG. 4.
Figure 12B:
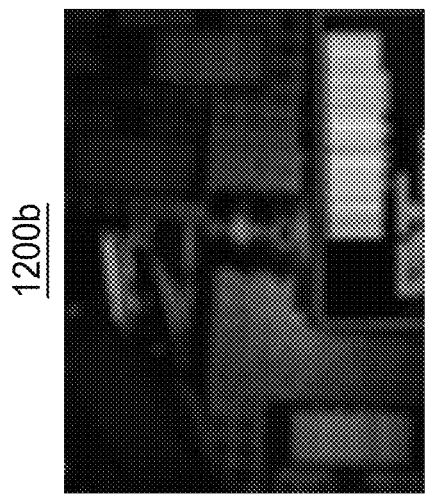
Figure 12C:
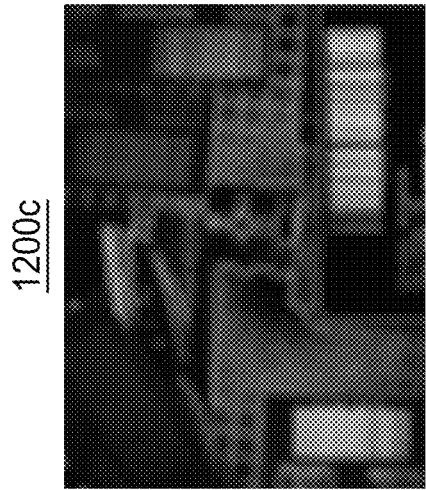

With regard to FIGS. 12A-12C, sets of averaged image data 1200a-1200c (collectively 1200) generated by an average function 606 of FIG. 6 performed in the level of detail blocks 410 within Stage-2 of the algorithm of FIG. 4 are shown. The average function 606 smoothens the features in the image data 1102 of FIG. 11. The averaged image data 1200 is output from Stage-2 and input to Stage-3.

Figure 13A:
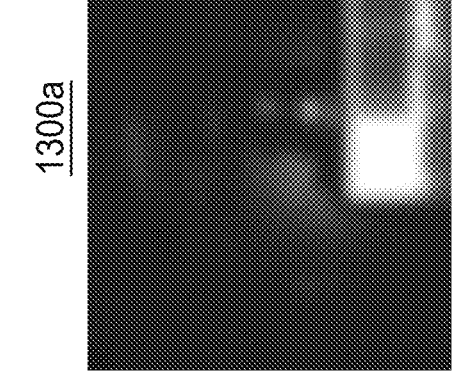
FIGS. 13A-13C are images output by a blend function of Stage-3 of the single-shot HDR algorithm of FIG. 4.
Figure 13B:
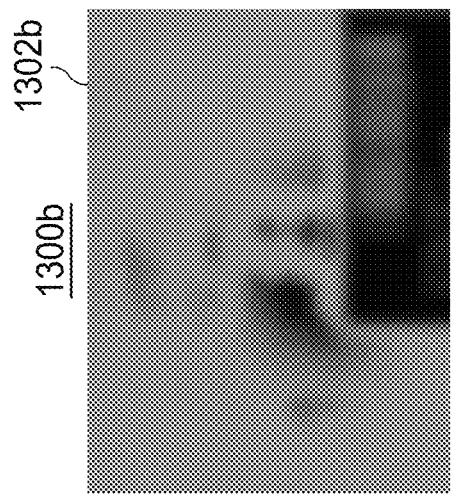
Figure 13C:
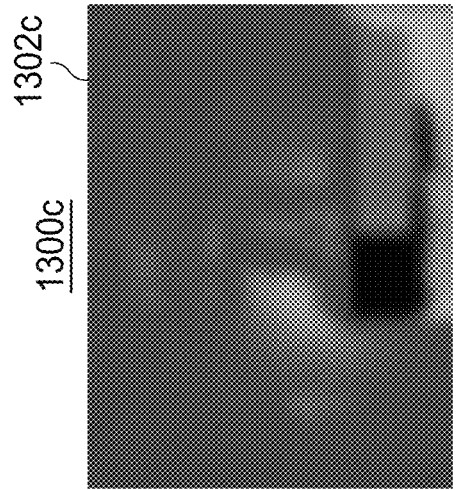

With regard to FIGS. 13A-13C, sets of blended image data 1300a-1300c (collectively 1300) output by the blend function 414 of Stage-3 of the single-shot HDR algorithm 400 of FIG. 4 are shown. The image data 1300 is shown to be quite different as the backgrounds 1302a-1302c transition from dark to bright to gray due to the blending functionality to help determine which is the best image from the three computed images.

Figure 14:
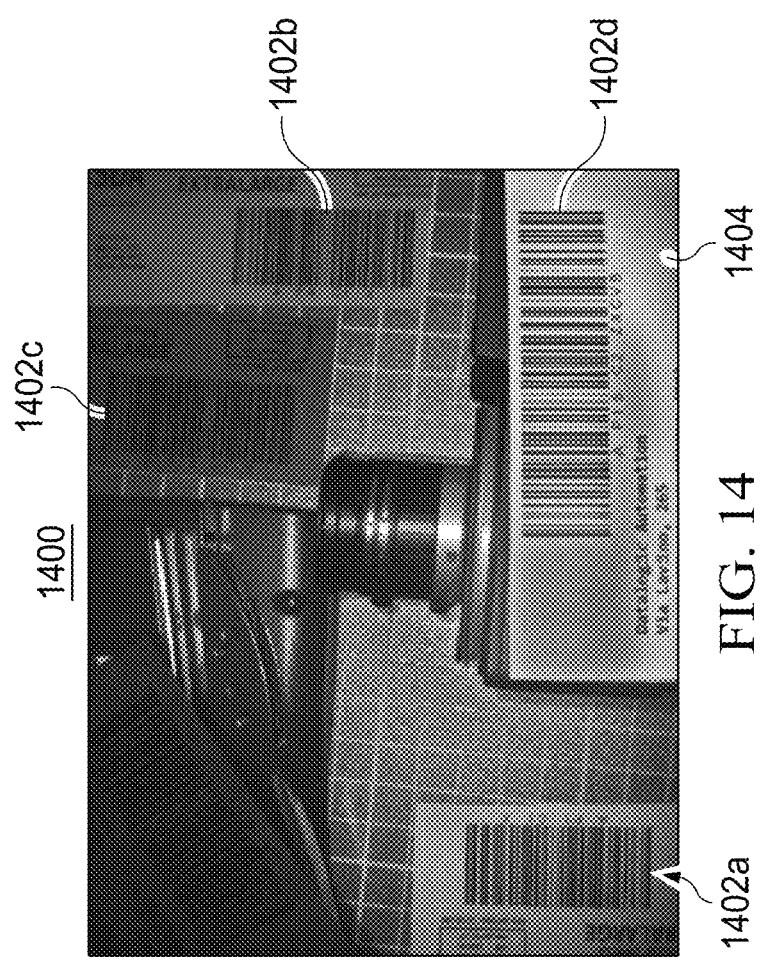
FIG. 14 is processed image data that is output from a mix function of the single-shot HDR algorithm of FIG. 4.

With regard to FIG. 14, blended image data 1400 that is output from the mix function 416 of the algorithm of FIG. 4 is shown. The image data 1400 is a result of the weighted sum average of the sets of simulated image data 900 and blended image data 1302. When compared to the sets of simulated image data of FIGS. 9A-9C, it is clear that barcodes 1402a-1402c in the background are more readable and the barcode 1402*d* on the barcode label 1404 are each more visible, and hence more likely to be decodable (assuming the codes are in focus).

With regard to FIGS. 15A-15C, sets of image data 1500*a*-1500*c* (collectively 1500) generated by stimulating exposure levels and applied to a single HDR image with the focus on the nearest code are shown. The captured image data is generated by a 1280×960 10-bit pixels with the algorithm configured with K=3, V1=1, V2=2, and V3=4. It should be understood that alternative variable values may be utilized, and the values may vary based on the environment and other factors of the imaging. In this case, four codes are present, including three background codes 1502*a*-1502*c* and one foreground code 1502*d*. The background codes are difficult to see in the image data 1500*a*, but more visible in the third image data 1500*c*.

With regard to FIG. 15D, an LDR detailed output image 1500*d* generated by the algorithm of FIG. 4 that shows how four barcodes 1502*a*-1502*d* are visible, but only the nearest barcode 1502*d* is decodable as a result of the other barcodes being unfocused is shown. Even though the algorithm does not improve the decodability, the LDR-detailed image 1500*d* gathers all of the information of the three sets of simulated input images, thereby significantly enhancing the user experience (e.g., enhanced reliability) and the image appearance.

Figure 16A:
FIG. 16A-16C are the same sets of image data of the scene of FIGS. 15A-15C, and show that the nearest code (in focus) is decodable only in FIGS. 15A-15B while the other codes (out of focus) are not decodable.
Figure 16B:
Figure 16C:

With regard to FIG. 16A-16C, sets of image data 1600*a*-1600*c* (collectively 1600) of the scene of FIGS. 15A-15C, and show that the nearest code (in focus) is decodable only in FIGS. 15A-15B while the other codes (out of focus) are not decodable are shown. In each of the sets of image data 1600*a* and 1600*b*, which match the image data 1500*a* and 1500*b*, the codes 1602*a* and 1602*b* with their respective simulated lighting are decodable. However, the simulated image data 1600*c*, which matches the image data 1500*c*, is overexposed such that the code 1602*c* is not decodable. The decodable codes 1602*a* and 1602*b* have decode indicators 1604*a* and 1604*b*, while the code 1602*c*, which is overexposed and not decodable, does not have an indicator. It should be understood that the decodable indicators 1604*a*-1604*c* are illustrative, and that any indicator may be utilized to indicate that a machine-readable indicia was successfully decoded.

Figure 16D:
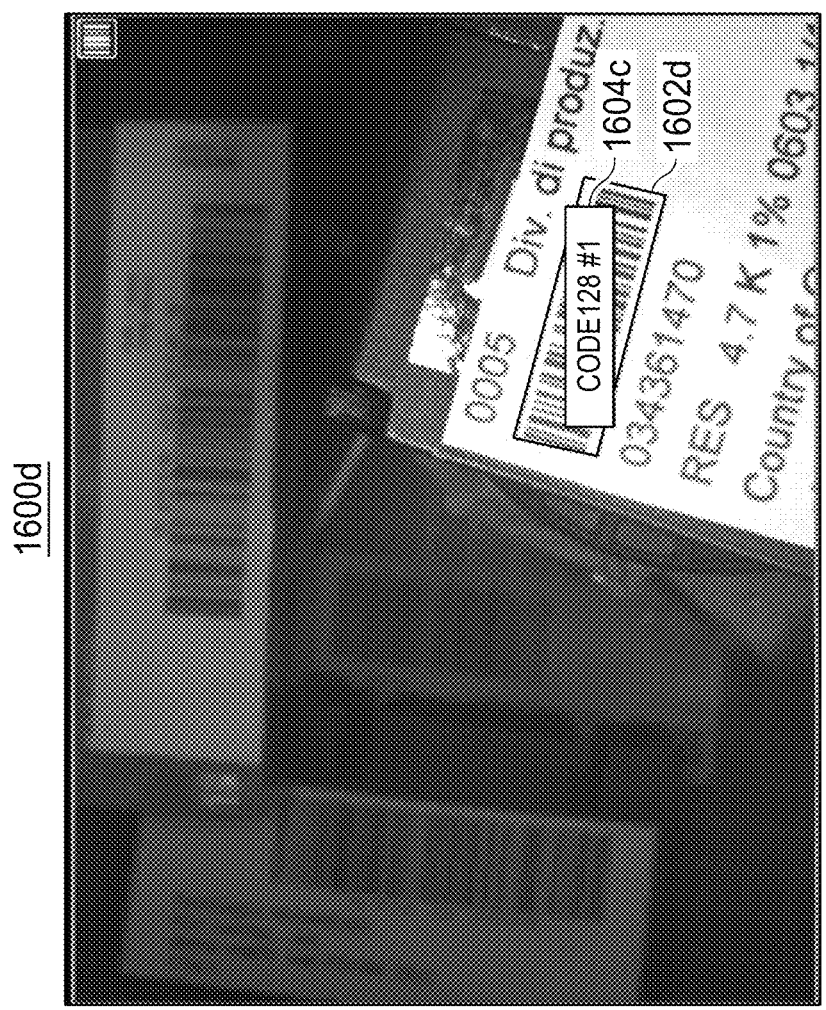
FIG. 16D is an LDR detailed output image generated by the algorithm of FIG. 4 that shows (i) how the nearest code of FIGS. 15A-15C is still decodable, (ii) how the other code of FIGS. 15A-15B are still not decodable and (iii) how the single-shot HDR algorithm does not adversely impact the ability to decode machine-readable indicia.

With regard to FIG. 16D, image data 1600*d* representative of an LDR detailed output image generated by the algorithm of FIG. 4 that shows (i) how the nearest code of FIGS. 15A-15C is still decodable, (ii) how the other code of FIGS. 15A-15B are still not decodable and (iii) how the single-shot HDR algorithm does not adversely impact the ability to decode machine-readable indicia is shown. The brightness of the code 1602*d* may be similar to the brightness of either of the codes 1602*a* or 1602*b*, which are both decodable, and includes a decode indicator 1604*d*. Moreover, as exemplified by the images 1600*a*-1600*d*, the single-shot HDR algorithm 400 enables improvement of a captured image without compromising decodability of the codes. In particular, the output image 1600*d* "collects" all of the decodable codes 1602*a* and 1602*b* of the simulated input images 1600*a*-1600*c*.

It should be understood that the algorithm 400 to produce an LDR detailed output image may be applied to any captured image that includes or does not include machine-readable indicia. Moreover, the LDR output image may be used for any purpose. For example, the algorithm 400 that may be deployed as a hardware solution and may be deployed on a variety of different electronic devices, such as mobile devices (e.g., smart phones) or non-mobile devices (e.g., surveillance cameras). The algorithm 400 may be embodied on any hardware device, including a stand-alone electronic device or incorporated within another electronic device already existing on a system. The algorithm 400 may enable the same or similar functionality described herein to be utilized, while supporting relative motion within the captured images.

Figure 17C:
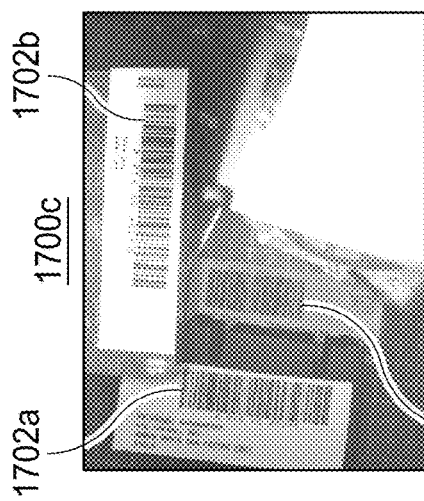
FIGS. 17A-17C are the same sets of image data of the scene of FIGS. 15A-15C, but the focus is on the farthest codes.
Figure 17B:
Figure 17A:
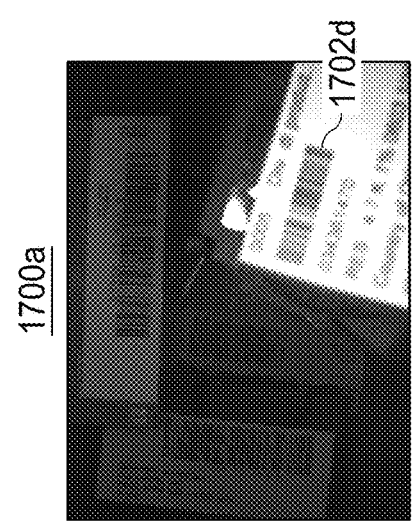

With regard to FIGS. 17A-17C, the same sets of image data 1700*a*-1700*c* of the scene of FIGS. 15A-15C are shown, but the focus is on the farthest codes 1702*a*, 1702*b*, and 1702*c* (collectively 1700). Because the focus is on the farther codes 1700, the ability to decode those codes are exemplified.

Figure 17D:
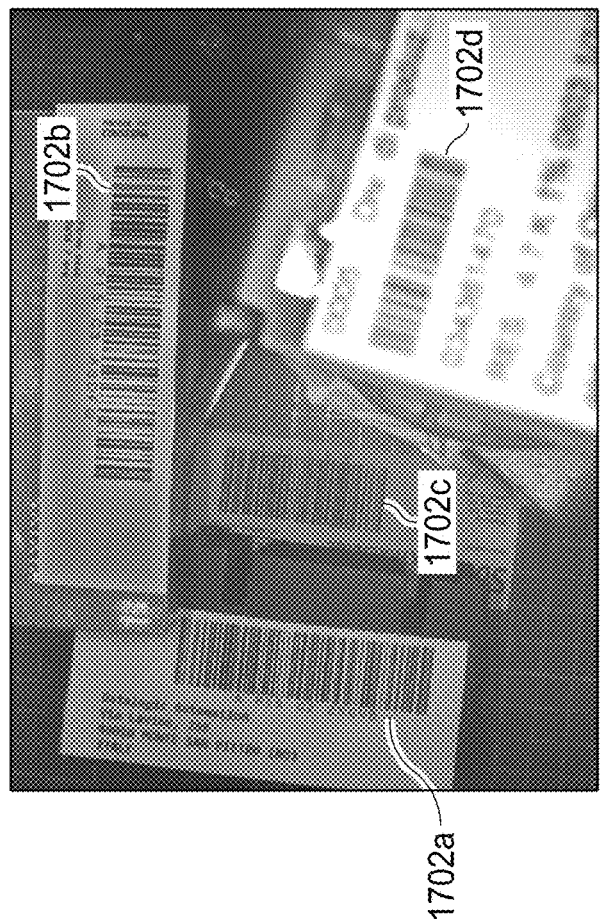
FIG. 17D is an LDR detailed output image generated by the algorithm of FIG. 4 that shows how four barcodes are visible simultaneously, where the nearest barcode is from FIG. 17A and the other three barcodes are from FIGS. 17B-17C.

With regard to FIG. 17D, an LDR detailed output image generated by the algorithm of FIG. 4 that shows how four barcodes are visible simultaneously, where the nearest barcode is from FIG. 17A and the other three barcodes are from FIGS. 17B-17C is shown. In this case, it is not possible to read the foreground code 1702*d* because the code 1702*d* is out of focus and overexposed. The LDR detailed output image 1700*d* thus helps improve the ability to decode machine-readable indicia, in this case barcodes, such that an improved user experience results.

Figure 18A:
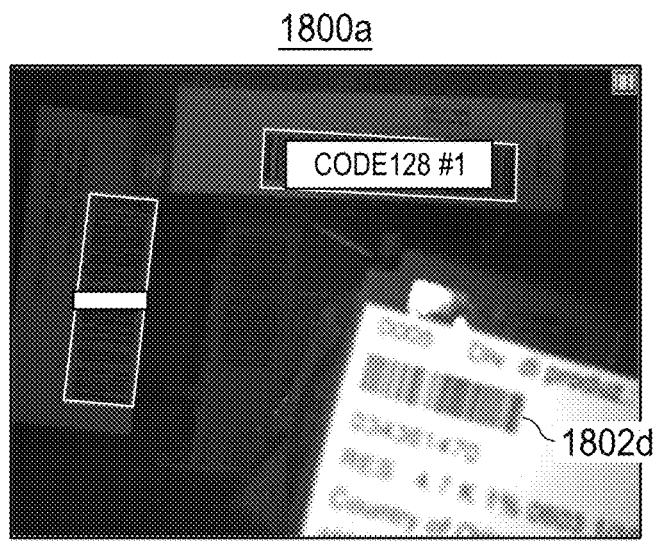
FIGS. 18A-18C are the same sets of image data of the scene of FIGS. 17A-17C, and show that the nearest code (out of focus) is not decodable while the other codes (in focus) are decodable in FIGS. 18A-18C.
Figure 18B:
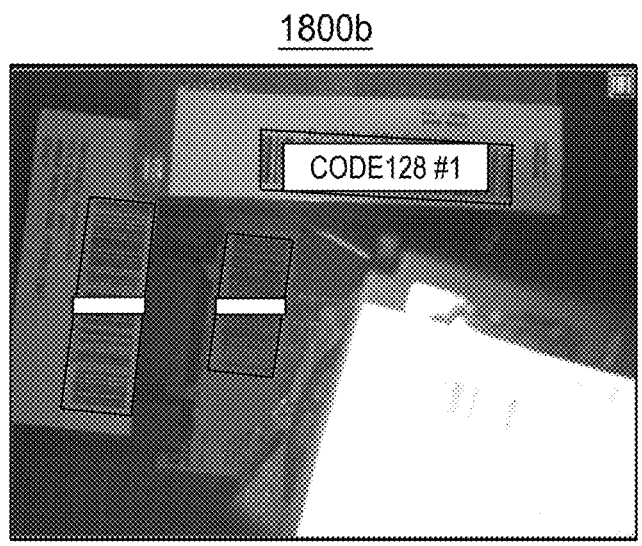
Figure 18C:
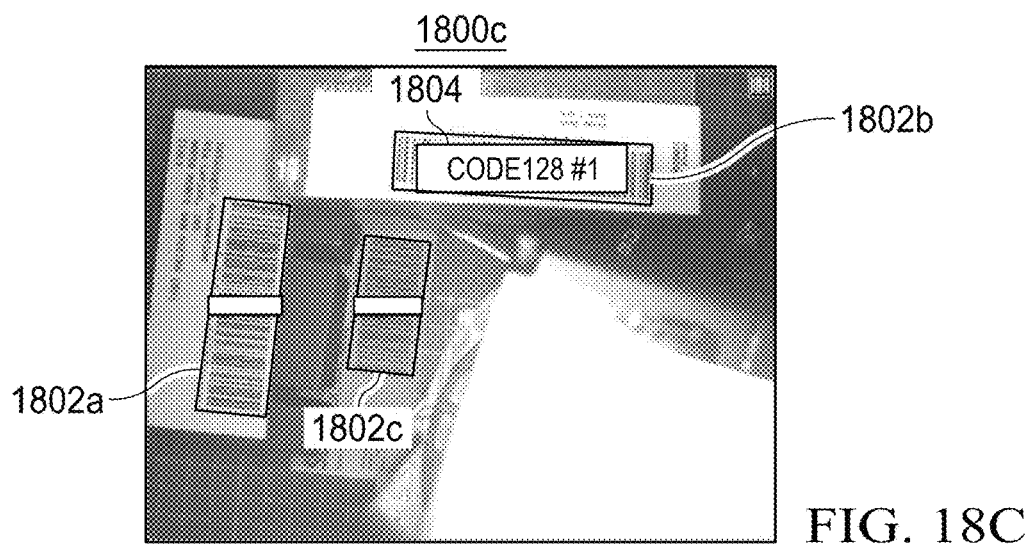

With regard to FIGS. 18A-18C, the same sets of image data of the scene of FIGS. 17A-17C, and show that the nearest code (out of focus) is not decodable while the other codes (in focus) are decodable in FIGS. 18A-18C are shown. In this example, in the LDR detailed output image data 1800*d* of FIG. 18D, all four codes 1802 are neither overexposed nor underexposed. However, the code 1802*d* is not decodable due to being out of focus. As such, this example shows that the single-shot HDR algorithm 400 of FIG. 4 can improve both the image appearance and the decodability of machine-readable indicia.

Figure 18D:
FIG. 18D is an output LDR detailed image generated by the algorithm of FIG. 4 that shows how each of the codes that are in focus of FIGS. 18A-18C are decodable.

With regard to FIG. 18D, an output LDR detailed image 1800*d* generated by the algorithm 400 of FIG. 4 shows how each of the codes 1802*a*-1802*c* that are in focus are decodable. An indicia 1804 (e.g., "CODE 128 #1") may be displayed on an electronic display overlaying each of the decodable codes 1802*a*-1802*c* when decoded by a code reader.

Figure 19:
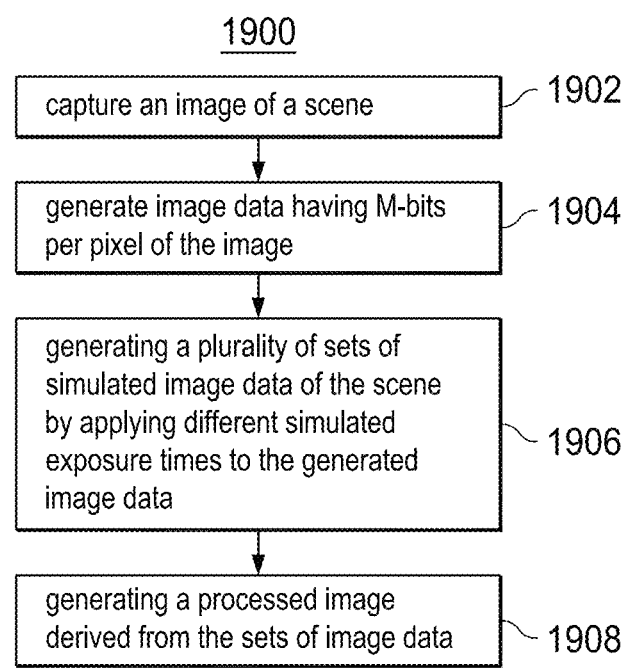
FIG. 19 is a flow diagram of an illustrative process of a single-shot HDR image algorithm that may be used to capture an HDR image to output an LDR image having good contrast in the image data.

With regard to FIG. 19, a flow diagram of an illustrative single-shot HDR process 1900 that may be used to capture an HDR image and output an LDR image having good contrast in the LDR image data is shown. The process 1900 may start at step 1902, where an image of a scene may be captured. At step 1904, image data having M-bits per pixel may be generated, where an image sensor that produces more than 8 bits per pixel image data may be used. Multiple sets of simulated image data of the scene may be generated by applying different simulated exposure times to the generated image data. It should be understood that the simulated image data includes the same images, but that the brightness (and/or other parameters) may be adjusted to represent different exposure times. The number of sets of simulated image data may be two or more. At step 1908, a processed image derived from the sets of simulated image data may be generated. The processed image may be an LDR image that has improved image qualities, such as providing for the ability to read machine-readable indicia and reducing the lighting flatness that would otherwise exist.

In generating the image data with M-bits per pixel, the image data has more than eight bits per pixel. In generating multiple sets of simulated image data, at least two sets of simulated image data may be generated. In generating at least two sets of simulated image data, each of the sets of simulated image data may be generated by (i) multiplying the generated image data by different scale factors to generate different sets of scaled image data with P-bits per pixel, wherein P is greater than M, and (ii) saturating the pixel values of the sets of scaled image data by limiting pixel values to a maximum value, the maximum value may be defined by a maximum number of N that defines a number of bits per pixel (N-bits) to produce the sets of simulated image data, wherein N is less than P. In saturating the sets of scaled image data, the pixel values may be limited to a maximum value of 255. A level of detail of each of the sets of simulated image data may be computed by (i) smoothing each of the sets of simulated image data to produce sets of smooth image data, (ii) computing gradient image data of each of these sets of smooth image data to produce sets of gradient image data, and (iii) averaging the sets of gradient image data to produce sets of detailed image data having N-bits per pixel.

The process may further include blending the sets of detailed image data to produce the processed image having N-bits per pixel. Capturing an image of a scene may include capturing a high dynamic range (HDR) image, and producing the processed image may include producing a low dynamic range (LDR) image. Blending the sets of detailed image data may include (i) adding the respective pixels of the sets of detailed image data to produce a summation set of detailed image data, (ii) dividing each of the sets of detailed image data by the summation set of detailed image data to form sets of sub-blended image data, and (iii) smoothing the sets of sub-blended image data to form sets of blended image data. Mixing the sets of blended image data may be performed by (i) multiplying the sets of blended image data by the respective sets of detailed image data to produce sets of weighted image data, and (ii) summing the sets of weighted image data to produce weighted average image data that represents the processed image.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A method of processing an image, comprising:
   capturing an image of a scene;
   generating image data having M-bits per pixel of the image;
   generating of at least two sets of simulated image data of the scene by applying different simulated exposure times to the generated image data, and including generating each of the sets of simulated image data by:
multiplying the generated image data by different scale factors to generate different sets of scaled image data with P-bits per pixel, wherein P is greater than M; and
saturating the pixel values of the sets of scaled image data by limiting pixel values to a maximum value, the maximum value defined by a maximum number of n that defines a number of bits per pixel (N-bits) to produce the sets of simulated image data, wherein N is less than P; and
generating a processed image derived from the sets of simulated image data.

2. The method according to claim 1, wherein generating image data with M-bits per pixel includes generating image data having more than eight bits per pixel.

3. The method according to claim 1, wherein saturating the sets of scaled image data includes limiting the pixel values to a maximum value of 255.

4. The method according to claim 1, further comprising computing a level of detail of each of the sets of simulated image data by:
smoothing each of the sets of simulated image data to produce sets of smooth image data;
computing gradient image data of each of these sets of smooth image data to produce sets of gradient image data; and
averaging the sets of gradient image data to produce sets of detailed image data having N-bits.

5. The method according to claim 4, further comprising blending the sets of detailed image data to produce the processed image having N-bits.

6. The method according to claim 5, wherein capturing an image of a scene includes capturing a high dynamic range (HDR) image, and wherein producing the processed image includes producing a low dynamic range (LDR) image.

7. The method according to claim 5, wherein blending the sets of detailed image data includes:
adding the respective pixels of the sets of detailed image data to produce a summation set of detailed image data;
dividing each of the sets of detailed image data by the summation set of detailed image data to form sets of sub-blended image data; and
smoothing the sets of sub-blended image data to form sets of blended image data.

8. The method according to claim 7, further comprising mixing the sets of blended image data by:
multiplying the sets of blended image data by the respective sets of detailed image data to produce sets of weighted image data; and
summing the sets of weighted image data to produce weighted average image data that represents the processed image.

9. The method according to claim 1, further comprising decoding a barcode identified within the processed image.

10. The method according to claim 1, wherein generating at least two sets of simulated image data of the scene by applying different simulated exposure times is independent of an actual exposure time when capturing the image.

11. A system for processing an image, comprising:
an image sensor configured to capture an image of a scene and to generate image data having M-bits per pixel of the image;
electronics in electrical communication with the image sensor, and configured to:
generate of at least two sets of simulated image data of the scene by:
applying different simulated exposure times to the generated image data;
multiplying the generated image data by different scale factors to generate different sets of scaled image data with P-bits per pixel, wherein P is greater than M; and
saturating the pixel values of the sets of scaled image data by limiting pixel values to a maximum value, the maximum value defined by a maximum number of n that defines a number of bits per pixel (N-bits) to produce the sets of simulated image data, wherein N is less than P; and
generate a processed image derived from the sets of simulated image data.

12. The system according to claim 11, wherein the electronics, in generating image data with M-bits per pixel, are further configured to generate image data having more than eight bits per pixel.

13. The system according to claim 11, wherein the electronics, in saturating the sets of scaled image data, are further configured to limit the pixel values to a maximum value of 255.

14. The system according to claim 11, wherein the electronics are further configured to compute a level of detail of each of the by being configured to:
apply a mathematical function to smooth each of the sets of simulated image data to produce sets of smooth image data;
compute gradient image data of each of the sets of smooth image data to produce sets of gradient image data; and
average the sets of gradient image data to produce sets of detailed image data having N-bits.

15. The system according to claim 14, wherein the electronics are further configured to blend the sets of detailed image data to produce the processed image having N-bits.

16. The system according to claim 15, wherein the electronics, in capturing an image of a scene, are further configured to capture a high dynamic range (HDR) image, and wherein the electronics, in producing the processed image, are further configured to produce a low dynamic range (LDR) image.

17. The system according to claim 15, wherein the electronics, in blending the sets of detailed image data, are further configured to:
add the respective pixels of the sets of detailed image data to produce a summation set of detailed image data;
divide each of the sets of detailed image data by the summation set of detailed image data to form sets of sub-blended image data; and
smooth the sets of sub-blended image data to form sets of blended image data.

18. The system according to claim 17, wherein the electronics are further configured to mix the sets of blended image data by being configured to:
multiply the sets of blended image data by the respective sets of detailed image data to produce sets of weighted image data; and
sum the sets of weighted image data to produce weighted average image data that represents the processed image.

19. The system according to claim 11, further comprising an electronic device incorporating the image sensor and the electronics.

20. The system according to claim 19, wherein the electronic device includes a code reader configured to read a machine-readable medium located within the processed image.

* * * * *